United States Patent [19]
Harper

[11] 3,777,837
[45] Dec. 11, 1973

[54] TRACTOR

[76] Inventor: Murry D. Harper, 218 22nd St., Dunbar, W. Va. 25064

[22] Filed: Mar. 2, 1971

[21] Appl. No.: 120,172

[52] U.S. Cl. ............... 180/70 R, 180/1 F, 180/11, 180/19 R, 180/77 R, 74/710.5, 74/765
[51] Int. Cl. ..................... B60k 17/06, B60k 23/06
[58] Field of Search ................. 180/70 R; 74/764, 74/765, 750, 710.5

[56] References Cited
UNITED STATES PATENTS

| | | | |
|---|---|---|---|
| 1,654,924 | 1/1928 | Douglas | 180/70 R |
| 3,215,000 | 11/1965 | Senkowski et al. | 74/710.5 |
| 1,406,316 | 2/1922 | Whitten | 180/70 R |
| 1,814,096 | 7/1931 | Saki | 74/765 |
| 1,181,079 | 4/1916 | Kelso | 74/750 R X |
| 1,479,292 | 1/1924 | Farley | 74/750 R |
| 2,538,708 | 1/1951 | Rose | 74/768 |
| 3,339,662 | 9/1967 | Hanson et al. | 180/70 R X |
| 1,938,848 | 12/1933 | Matthews | 74/710.5 X |
| 3,050,163 | 8/1962 | Dhuicq | 180/70 R |

Primary Examiner—Kenneth H. Betts
Assistant Examiner—John P. Silverstrim
Attorney—Clarence A. O'Brien and Harvey B. Jacobson

[57] ABSTRACT

A garden type tractor of the hand manipulated and controlled type having two drive wheels thereon and a forwardly directed power take off onto which various attachments may be connected. The tractor includes a transmission of the planetary type enabling a change in drive speed and direction by the use of a manual shifting lever which may move into a position for locking the differential for the drive wheels. An attachment is provided for converting the tractor to a four wheel type and including an occupants seat for convenience and ease of control of the tractor. The drive train of the tractor includes an automatic clutch, chain drive, transmission and worm drive to the differential which provides a versatile drive arrangement.

13 Claims, 9 Drawing Figures

Murry D. Harper

BY Clarence A. O'Brien
and Harvey B. Jacobson
Attorneys

Murry D. Harper

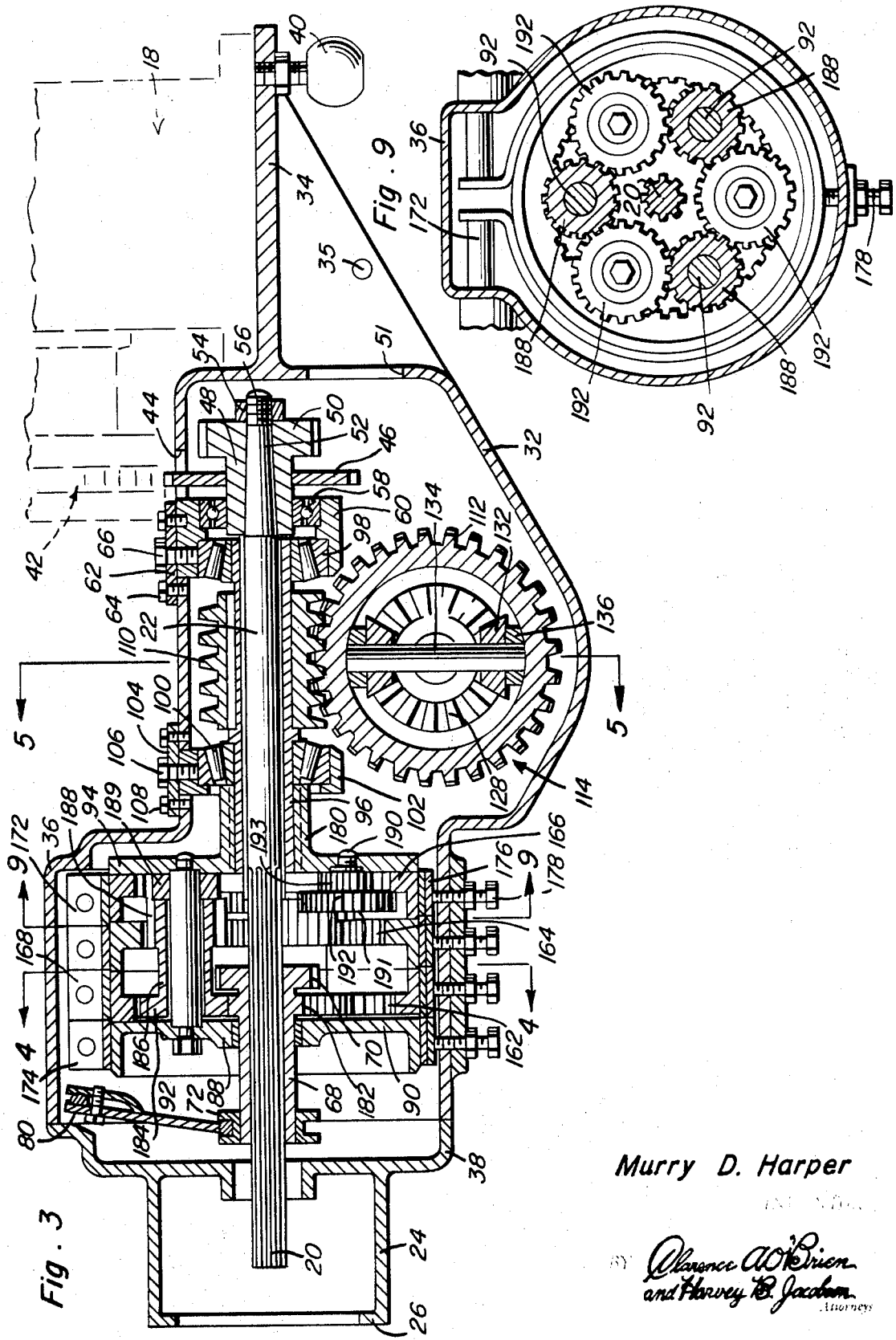

Murry D. Harper

TRACTOR

BACKGROUND OF THE INVENTION

1. Field of the Invention

The present invention generally relates to garden type tractors and more particularly to improvements in the drive train, structural features and riding attachment therefor.

2. Description of the Prior Art

Garden tractors are used extensively by home owners for attaching various implements requiring power for operation. Prior U.S. Pat. Nos. 1,944,789 issued Jan. 23, 1934; 2,258,517 issued Oct. 7, 1941 and 2,538,708 issued Jan. 17, 1951 illustrate various structural features which have been incorporated into garden tractors of the type concerned herewith and attachments therefor. This type of tractor has been manufactured and sold for a number of years and various attachments for this type of tractor have also been manufactured and sold for a number of years. While the tractor has been successfully employed, certain features thereof are not completely satisfactory.

SUMMARY OF THE INVENTION

An object of the present invention is to provide a garden tractor of the two wheel, hand manipulated type having an improved and novel transmission incorporated therein having a planetary gear system and single shift lever to change speed of the output shaft and also change the direction of rotation thereof.

Another object of the invention is to provide a tractor having a differential drive to the wheels and a manually controlled differential lock.

A further object of the invention is to provide a riding attachment for the tractor which is rigidly associated with the tractor structure and disposed forwardly of the engine and drive unit in order to convert the tractor to a riding type garden tractor.

Still another object of the invention is to provide a garden tractor which includes a novel drive train and is relatively trouble-free and long-lasting.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a longitudinal, sectional view, on an enlarged scale, taken substantially upon a plane passing along section line 3—3 of FIG. 2 illustrating the specific structural details of the drive mechanism including the transmission and differential associated with the worm gear output from the transmission.

FIG. 9 is a sectional view taken substantially upon a plane passing along section line 9—9 of FIG. 3.

DESCRIPTION OF THE PREFERRED EMBODIMENT

Figure 8:
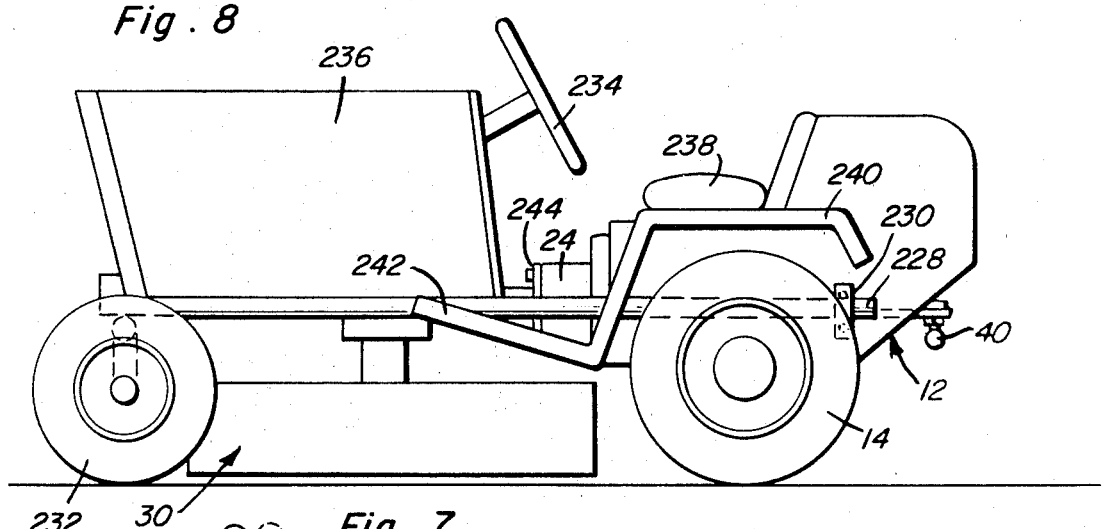
FIG. 8 is a side elevational view illustrating the riding attachment associated with the tractor and including front steerable wheels and steering wheel associated with an occupant's seat.
Figure 7:
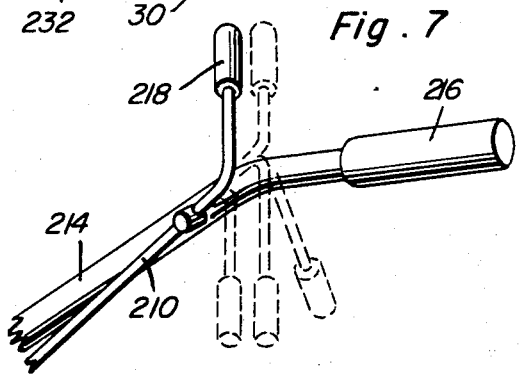
FIG. 7 is a fragmental perspective view illustrating the shift control lever for controlling the transmission.
Figure 2:
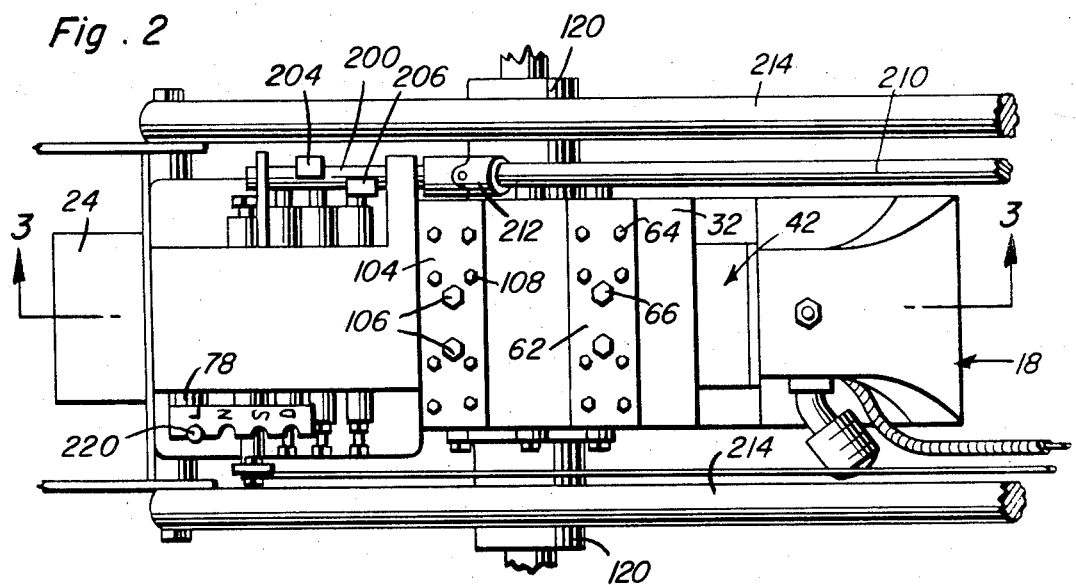
FIG. 2 is a plan view of the drive structure for the tractor and power take off.

Referring now specifically to the drawings, the garden type tractor of the present invention is generally designated by the numeral 10 and includes a drive train generally designated by the numeral 12 having a pair of wheels 14 and 16 driven thereby which form the supports for the tractor 10 and drive the tractor from a suitable prime mover 18 such as an internal combustion engine which may be of conventional construction and have a suitable horsepower output for the particular results desired. Projecting forwardly from the drive train 10 is the forward splined end 20 of an elongated drive shaft 22 that is disposed interiorly of a tubular housing 24 having a vertical flange 26 at the forward end thereof with the flange being provided with apertures 28 all of which serve as an adapter by which various attachments may be connected such as the mower attachment 30 illustrated in FIG. 8.

The drive train 12 includes an enlarged central housing 32 having a rearwardly extending mounting plate 34 integral therewith and a forwardly extending transmission housing 36 integral therewith with the forward end of the transmission housing 36 having a closure plate or housing 38 associated therewith with the tubular housing projecting therefrom. A male hitch member 40 is attached to the rear end of the mounting plate 34 and may be in the form of a ball for connecting various implements to be towed by the tractor. Any other suitable type of hitch member may be attached to the plate 34 by which various implements to be towed may be attached with the characteristics of the hitch being determined by the type of relative movement desired between the tractor and the implement towed thereby.

The engine 18 is supported on the mounting plate 34 and includes a chain drive 42 having a chain depending into an aperture 44 in the upper end of the casing 32 in engagement with a sprocket gear 46 rigidly secured to the hub 48 of a gear 50 mounted on a tapered end portion 52 of the shaft 22 and being secured thereon by a retaining nut 54 threaded onto a reduced threaded end 56 on the tapered portion 52 of the shaft 22. Thus, the internal combustion engine 18 supplies power to the shaft 22 through a chain drive and automatic clutch assembly (not shown).

The hub 48 of the gear 50 is journalled by a bearing assembly 58 from a bearing housing 60 extending through the housing and removably supported in the housing by a small mounting plate 62 secured to the housing by fasteners 64 with the bearing housing 60 being supported from the plate 62 by fasteners such as bolts 66 which enable adjustment for alignment.

The shaft 22 extends forwardly through the transmission housing and is splined to an elongated hub 68 which is provided with a gear 70 on one end thereof and spaced flanges 72 on the other end thereof for longitudinal shifting of the splined hub and gear on the drive shaft 22.

Figure 6:
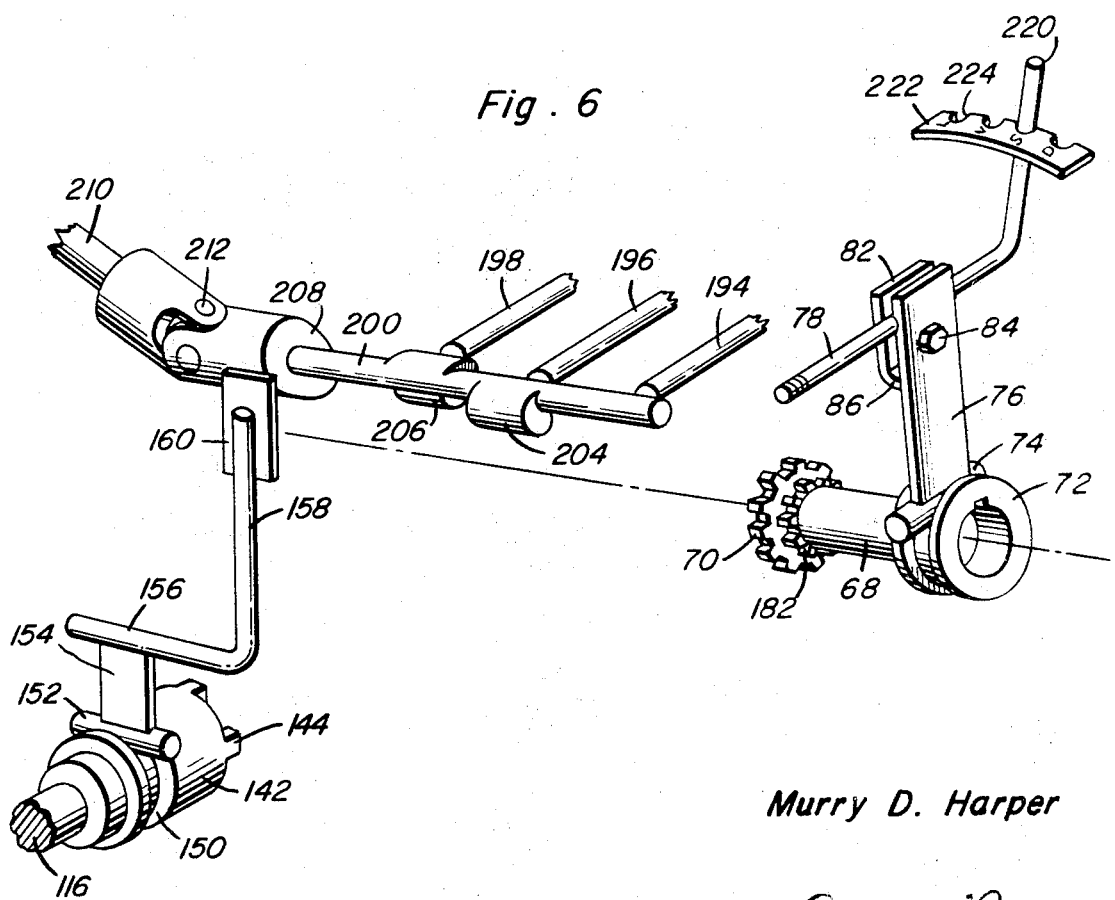
FIG. 6 is a schematic perspective view of the control cam components for controlling the transmission and differential lock.

The peripheral flanges 72 either are integral with the hub 68 or detachably but rigidly affixed thereto. Conveniently, the flanges may be a peripheral U-shaped member keyed to the hub 68 in a well known manner. Received between the flanges 72 is a cylindrical rod or bar 74 attached to the lower end of a depending rigid actuating member 76 as illustrated in FIG. 6. The rod or bar 74 may have a notch in the lower edge and is disposed substantially tangential to the bottom of the groove space defined by the flanges 72 so that the hub 68 can rotate in relation thereto and the cylindrical construction of the rod or bar 74 reduces friction and wear to a minimum. The upper end of the strap or actuating member 76 is attached to a rod or shaft 78 extending transversely of the housing 36 and journalled therein for oscillatory movement. The portion of the shaft 78 engaged by the strap member 76 is flatened at 80 and a clamp plate 82 engages the opposite surface of the shaft 78 and is clamped to the strap member 76 by a fastening bolt 84. The lower end of the clamp member 82 is inturned as at 86 to form a fulcrum for the clamp plate 82 so that by tightening the fastening bolt 84, the actuating strap member 76 will be rigidly attached to the shaft 78 so that as the shaft 78 is oscillated, the flanges 72, hub 68 and gear 70 will be moved longitudinally on the splined end 20 of the shaft 22.

The exterior of the hub 68 extends through and is journalled on a bearing hub 88 of a circular plate 90 which forms a portion of the transmission and is in the form of a planet carrier in that it supports a plurality of circumferentially spaced supporting shafts or rods 92 which have their other ends supported in a corresponding plate 94 disposed in spaced parallel relation to the plate 90. The details of the transmission will be described hereinafter but it includes a hollow output shaft 96 in concentric relation to the drive shaft 22 as illustrated in FIG. 3. The hollow output shaft 96 extends to a point adjacent the hub 48 and one end thereof is supported by a thrust bearing assembly 98 carried in the bearing housing 60 along with the ball bearing assembly 58 and the other end thereof is journalled by an oppositely disposed thrust bearing assembly 100 supported in a bearing housing 102 supported in depending relation to the top of the housing 32 by a support plate 104, a fastener 106 extending therethrough and into the bearing housing 102 with the support plate 104 being releasably attached to the housing 32 by fasteners 108. With this construction, both bearing housings or supports 60 and 102 may be removed from the housing 32 for replacement or repair of the bearing assembly supported thereby.

Disposed between the thrust bearing assemblies 58 and 100 is a worm drive gear 110 rigidly fixed to the hollow shaft 96 such as by a conventional key or the like so that the worm gear 110 is rotated with the hollow output shaft 96 from the transmission. The worm gear 110 is in meshing engagement with a worm pinion gear 112 which is connected with a differential assembly generally designated by the numeral 114. The differential assembly includes laterally extending axles 116 and 118 which are connected to the wheels 14 and 16 respectively for driving the wheels 14 and 16. The axles are supported by axle housing assemblies 120 attached to the housing 32 by attaching flanges 122. The axle housing assemblies 120 include supporting bearing assemblies 124 and a seal 126 which is conventional structure and the inner end of each axle 116 is keyed to an axle gear 128 having a hub portion journalled in a bearing assembly 130 carried by the inner end of the axle housing 120. The axle gear 128 is in the form of a bevel gear in meshing engagement with bevel gears 132 carried on a transverse shaft 134 that is mounted in supports 136 rigid with the worm pinion gear 112. The gears 128 and 132 are closed in a cage or housing 138 which has hub portions 140 journalled in the bearing assemblies 130 in encircling relation to the hub portions of the axle gears 128. The differential structure provides drive for the axles 116 and 118 in a conventional manner inasmuch as rotation of the worm gear 110 causes rotation of the worm pinion 112 thus rotating the shaft 134 and carrying the gears 132 as well as the housing 138 therewith. When one wheel is moving at a different speed, such as when turning, the gears 132 can rotate on the shaft 134 in a manner well known in conventional differential structures.

The differential is provided with a lock which includes a sliding hub 142 mounted on axle 116 and provided with axial lugs 144 on one end thereof. The lugs 144 are engageable with corresponding recesses or grooves 146 formed in the axle gear 128 and the hub 140 of the differential housing thus locking the differential hub and housing to the axle gear thus providing a simple but effective positive traction differential. The hub 142 is slidable on the axle 116 with the outward sliding movement thereof being limited by a collar 148 adjustably mounted on the axle 116 by a suitable setscrew or the like. The periphery of the hub 142 is provided with a groove 150 which receives a cylindrical rod 152 therein with the rod engaging the side walls of the groove 150. The rod 152 is attached to an actuating strap 154 carried by a shaft 156 which is journalled longitudinally in one of the axle housings 120 and which has an end portion 158 extending upwardly and terminating in a plate 160 in the form of a cam follower which will actuate the shaft 156 to move the sleeve 142 into engagement with the axle gear and differential hub for locking the axle gear and differential hub together. A suitable return spring may be associated with the differential lock mechanism to return it to its retracted position when the cam follower 160 is not being actuated.

Figure 4:
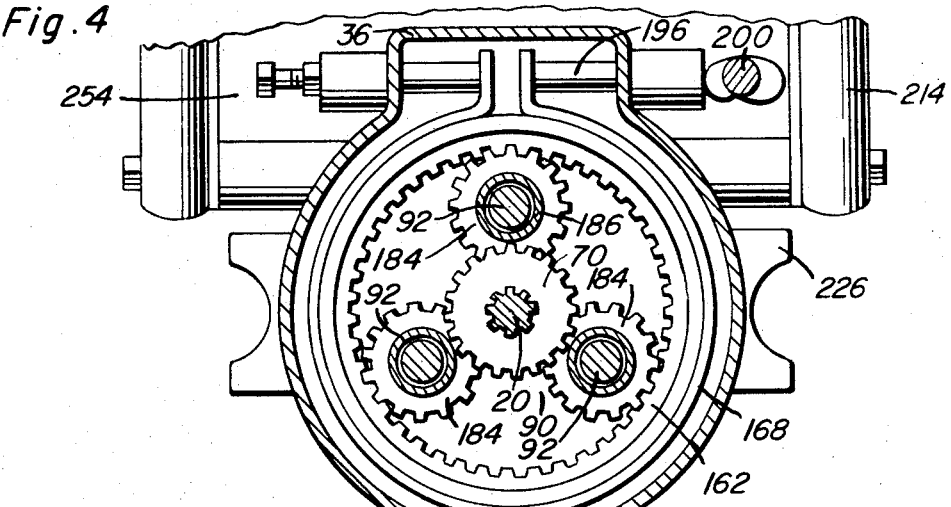
FIG. 4 is a transverse, sectional view taken substantially upon a plane passing along section line 4—4 of FIG. 3 illustrating further structural details of the planetary gear system employed in the transmission.
Figure 5:
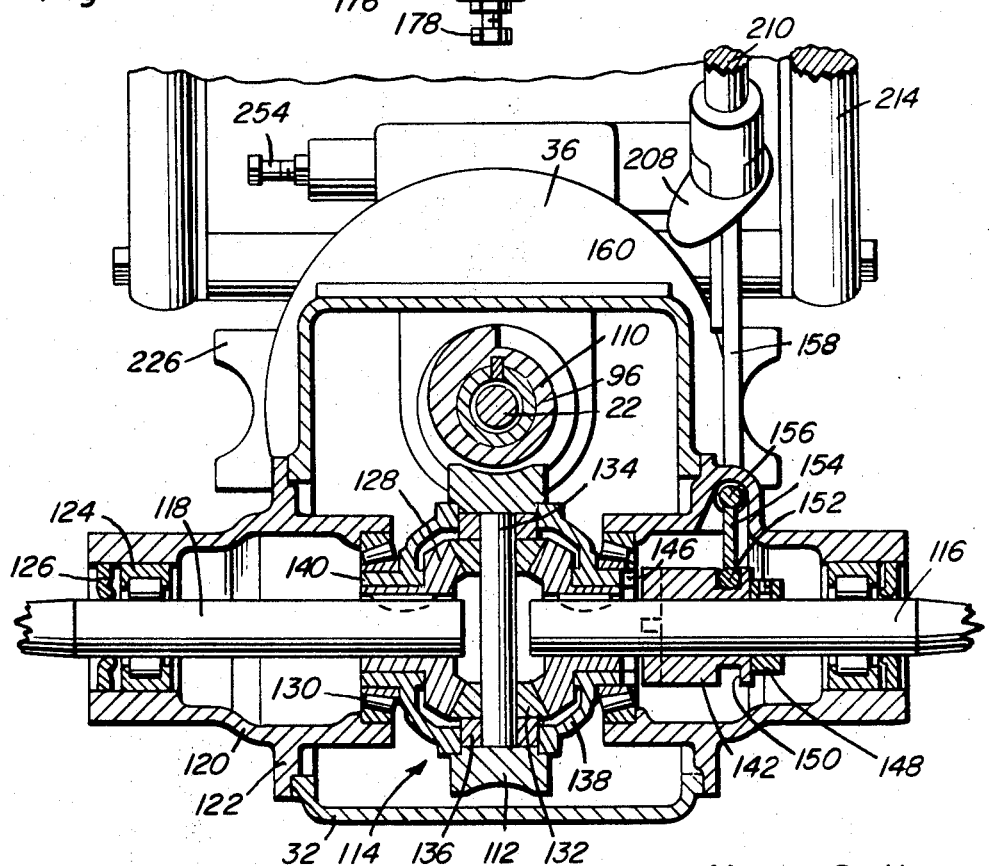
FIG. 5 is a transverse, sectional view taken substantially upon a plane passing along section line 5—5 of FIG. 3 illustrating further structural details of the worm gear drive, differential and differential lock.

Referring now specifically to FIGS. 3 and 4, the details of the transmission are illustrated with there being three ring gears disposed between plates 90 and 94 with the ring gears being designated by 162, 164 and 166. Each of the ring gears is provided with a brake structure 168, 170 and 172 respectively. The planet carrier 90 is also provided with a brake 174 which operates in the same manner as the other brakes. Each of the ring gears 162, 164 and 166 is provided with a supporting bearing assembly 176 which is adjustable by the use of an adjustment bolt 178 extending through the bottom of the casing 36 and a similar support is provided for the planet carrier 90. The adjustment of the supporting bearing assembly 176 by the screw threaded member 178 enables the transmission to be adjusted to compensate for wear during use of the device and to make sure that proper alignment and orientation of the components of the transmission is maintained.

The output shaft 96 from the transmission is keyed to hub 180 on plate 94 and the sliding hub 68 is provided with a second gear 182 adjacent gear 70 but being smaller in diameter as illustrated in FIG. 6.

Journalled on each of the shafts 92 is a planet gear 184 in constant meshing engagement with the ring gear 162 with the planet gear 184 having an elongated hub 186 integral therewith and having a smaller gear 188 of double length thereon in constant meshing engagement with the ring gear 164 and projecting axially beyond the ring gear 164 with a bearing member 189 interposed between the end of gear 188 and plate 94. The plate 94 is provided with a plurality of circumferentially spaced stub shafts 190 journalling idler gears 191 thereon each of which has a larger gear 192 and a smaller gear 193 integral therewith. The larger gear 192 meshes with the extended end of gear 188 and a portion of the periphery is received between ring gears 164 and 166. The smaller gear 193 is in constant mesh with ring gear 166.

Each of the brakes 168, 170 and 172 includes a horizontally reciprocating actuating rod 194, 196 and 198 which are disposed transversely of the housing 36 and terminate along side of a cam shaft 200 journalled thereon which is supported for rotation and sliding movement. The cam shaft is provided with cams 204, 206 and 208 thereon and has one end thereof connected to an operating rod 210 through a universal coupling 212. The operating rod 210 extends rearwardly along side a frame member 214 which terminates in a handle 216 for control of the tractor. The operating rod 210 terminates in an operating handle 218 which can move in an arcuate path and also move to shift the rod 210 longitudinally. Thus, by shifting the handle 218, the transmission may be conditioned so that it will provide a forward drive or a rearward drive at different speeds or in a position to actuate the differential lock. When the hub 68 is in the position illustrated in FIG. 3, the smaller gear 182 is meshed with gear 184 to provide a first gear or low speed range. When the hub 68 is moved inwardly to disengage gear 182 from gear 184, the gear 70 on the hub 68 will also be disengaged from any other gear thereby providing a neutral position. When the hub 68 is moved inwardly the next increment of movement, the gear 70 will mesh with the gear 188 carried by hub 86 thus providing a higher output speed range or a second gear. The next position of the hub 68 is completely in a forward position in which the gear 70 is meshed with gear 192 so that a drive range or transport speed is provided. In order to position the hub and shaft 72 in its four positions, the end of the shaft is provided with an upwardly extending handle 220 associated with a plate 222 having four spaced notches 224 thereon which resiliently engage the end 220 on the shaft 78 thereby resiliently retaining the shaft 78 in its adjusted position from the low speed or plowing speed as illustrated in FIG. 3, the next position or neutral position, the second speed position or the transport or drive speed position. The cam shaft 200 is movable longitudinally and the positive differential lock is operated by the cam 208 in one angular position of the cam shaft while the reverse is operated by one of the cams 204 or 206 depending upon the position of the shaft 206 while the rods 194 or 198 are actuated by one of the cams 204 or 206 depending upon the position of the shaft 200 thereby applying or releasing the brakes on the ring gears in a manner to reverse the output direction by including an additional gear in the drive train or change the speed of the output shaft of the transmission in a manner well known in the operation of planetary transmissions.

The housing 32 as well as the transmission housing 36 is provided with a pair of aligned attaching blocks 226 which have a semi-circular outwardly facing cavity for receiving horizontal frame rods 228 which are retained in position by removable caps 230 so that the frame rails or members 228 are rigidly connected to the drive assembly 12 and project forwardly therefrom. The forward end of the frame rails 228 are supported by ground engaging steerable wheels 232 which are controlled by a steering wheel 234 projecting rearwardly and upwardly from a housing 236 of any suitable shape, size and configuration. In this form of the invention, an occupants seat 238 is provided on the housing of the drive unit 12 and suitable fenders 240 are also provided thereon to facilitate a person gaining access to the seat 238 inasmuch as footrests 242 may be provided. In this embodiment, a mower may be attached to the tubular housing 24 by the usual flange and bolt construction 244 so that the tractor, in effect, becomes a four wheel tractor with front steerable wheels.

Figure 1:
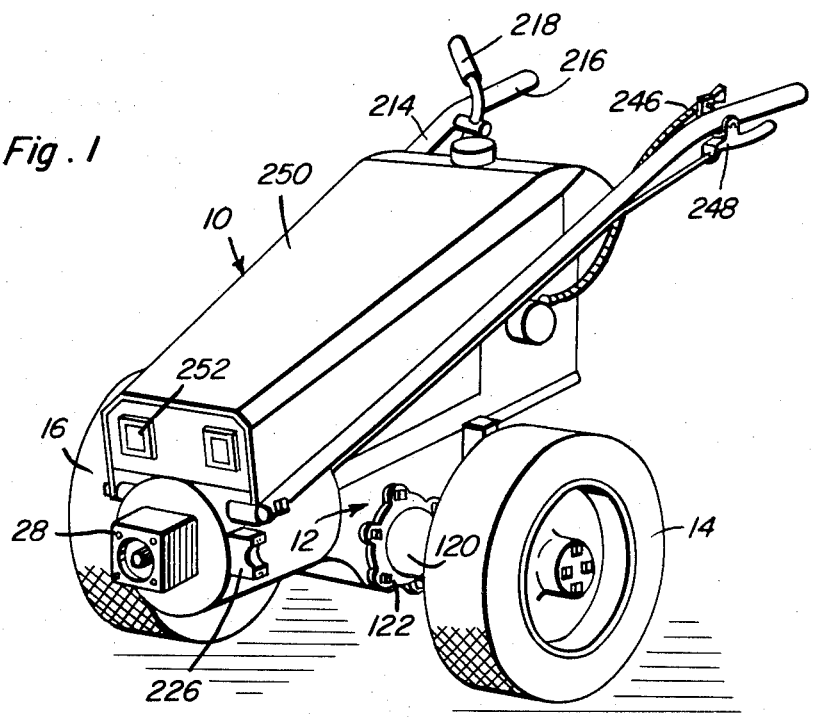
FIG. 1 is a perspective view of the garden tractor of the present invention.

When the tractor is employed in the manner illustrated in FIG. 1, the tractor is provided with the two frame elements 214 and two handles associated therewith together with a throttle control 246 for the engine and a manual control 248 operating the shaft 78. Also, a housing of sheet material or the like 250 may be provided along with lights 252 for night operation if desired. The gear 50 on the drive shaft 22 may drive an oil pump associated with an opening 51 in the casing 32 and additional weight may be provided for the unit for additional traction so that the wheels may have adequate traction. Such additional weight may be supported from below the supporting plate 34 by attachment to apertures 35 or the like.

FIG. 4 illustrates the structure of one of the brake bands 168 which encircles the ring gear 162 and is adjusted by a cam either 204 or 206 on the cam shaft 200 engaging the rod 196. The initial braking action of the brake bands may be adjusted by a screw threaded adjusting device 254 opposed to the rod 196 but serving to move a similar rod engaging a lug on one end of the brake band in the same manner that the rod 196 engages a lug on the opposite end of the brake band.

The tractor may be provided with various accessory items such battery, generator, electric starting, fuel tank, lubrication features and the like, the details of which are not illustrated. The transmission and differential lock assembly as well as particular drive train constitute essential elements of the invention and the rigid mounting of the front steerable wheel unit to convert the tractor into a four wheel tractor also constitute essential features of the invention. A single shifting unit is provided for changing speed in the transmission and to also lock the differential and to change the direction of output of the transmission. Shifting of the sun gear in the transmission changes speeds including a neutral position and will lock in reverse and forward gears to completely lock the transmission so that it will spin as a single unit for transport speed or direct drive. The brakes on the transmission stop forward and reverse directions on the tractor but allows the tractor to swing from side-to-side with differential action. Thus, a saw mounted on the tractor in the place of the mower can be swung into a tree without kicking back inasmuch as the tractor will swing from side-to-side while the brakes are locked. The four adjusting bolts under the transmission to support the brake bands and ring gears accurately on their centers provide for long wearing of the transmission. Also, the bearing block which supports the worm gear from outside milled surfaces on the chassis eliminates expensive boring on the chassis or housing. The shifting rod is mounted on the handle of the tractor by a suitable clamp band having adjustment therein for eliminating the drilling of holes in the handle of the tractor. Also, a power take off may be provided under the motor mount if desired.

The drive train on the present tractor is quite versatile and includes an automatic clutch, chain drive, transmission and worm drive. Without any change of center distances, the ratio of the transmission can be changed expediently over a wide range from a relatively slow speed to a relatively high speed enabling the device to be used for various purposes besides a tractor including use as a golf cart, all terrain vehicle, etc.

There are a minimum number of parts that gives a maximum speed change capability by shifting the sun gear and also selectively locking and releasing the brake bands on the ring gear with one shift lever serving to provide reverse and forward direction as well as differential lock and speed change within the limits of the planetary gear system by releasing and applying certain of the brake bands. Further variation in speed is provided by shifting the sun gear from a low position at one extreme end position of the sun gear, through a neutral position to a second position which is provided with a higher output speed than low and a third speed or direct drive.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A garden type tractor having a prime mover, a pair of driving wheels and a drive train interconnecting the prime mover and driving wheels, said drive train comprising a housing, a drive shaft disposed in said housing and including means for driving connection with the prime mover, a hollow output shaft disposed in said housing in concentric relation to the drive shaft, a transmission assembly drivingly interconnecting the drive shaft and output shaft for driving the output shaft at variable speeds in selected rotational direction in relation to the drive shaft, a differential assembly disposed in said housing, driving wheel supporting axles drivingly connected to the differential assembly and extending outwardly of the housing for driving said wheels, said output shaft including a worm drive gear thereon, said differential assembly including a cage having a worm pinion gear thereon in meshing engagement with the worm drive gear, each axle including an axle gear disposed on the inner end thereof and located in the cage, said cage including differential gear means journaled thereon in meshing engagement with the axle gears, and means selectively locking the differential cage to one axle gear for positively driving the axles from the differential cage, said transmission assembly including three ring gears disposed in said housing, a planet gear carrier disposed in said housing alongside of the ring gears, separately actuatable brake means engageable with the ring gears and planet carrier, said planet carrier including a double planet gear in constant meshing engagement with two of the ring gears, said drive shaft including spaced gears keyed thereto for selective driving engagement with the double planet gear for driving the ring gears at different speeds, said planet carrier being drivingly connected with the hollow output shaft of the transmission assembly to enable variable speed drive of the worm drive gear, said output shaft being supported by bearing means located at opposite end portions of the worm drive gear, bearing blocks supporting said bearing means, said housing including exteriorly disposed supporting plates connected to said bearing blocks to enable accurate support and positioning of the bearing blocks and output shaft by providing precision surfaces exteriorly of the housing, said means locking the differential cage to an axle gear including concentrically arranged hub portions on the axle gear and cage normally rotatable in relation to each other and including axially disposed lug means, a lock member slidable and rotatable with respect to an axle and including axial lugs for engagement with the lug means on the differential cage and axle gear to lock the cage and axle gear together for positive drive of both axles from the worm drive gear.

2. In a garden type tractor having a prime mover and a pair of driving wheels, a drive train interconnecting the prime mover and driving wheels, said drive train comprising a longitudinally elongated housing, an elongated drive shaft journalled in said housing and adapted to be drivingly connected to the prime mover, a transmission assembly drivingly connected with said drive shaft, said transmission assembly including an output shaft driven at variable speeds and in selected rotational direction by the transmission assembly, a differential assembly drivingly connected with the output shaft, and driving wheel supporting axles drivingly connected to the differential assembly for driving said wheels, and means locking the differential assembly to provide positive drive to both wheels, said transmission assembly including a planetary gear system including a planet carrier and three ring gears disposed along side thereof, separately actuatable brake means for the planet carrier and each of said ring gears, said planet carrier including a shaft with a double planet gear thereon constantly meshed with adjacent ring gears for varying the output speed of the transmission.

3. The structure as defined in claim 2 wherein said differential assembly includes an axle gear on the inner end of each axle, a differential housing and differential gears carried by the housing for movement therewith and rotation relative thereto, said means locking the differential including a slidable lock member rotatable on one axle and engageable with one of the axle gears and the differential housing thereby locking the axle gear and differential housing together for rotation as a unit thereby driving both axle gears positively at the same speed.

4. The structure as defined in claim 3 wherein said differential housing is provided with a worm pinion gear on the external periphery thereof, said output shaft having a worm drive gear thereon in meshing engagement with the worm pinion gear for driving the differential housing.

5. The structure as defined in claim 2 wherein the brake means for the planet carrier is provided with an operating member separate from the brake means for each of said ring gears.

6. The structure as defined in claim 5 wherein said brake means for the ring gears includes a reciprocal and rotatable cam shaft engaging actuators for the brake means for selectively actuating and releasing the brake means for the ring gears.

7. The structure as defined in claim 6 together with cam means on said cam shaft for actuating the differential lock in response to angular displacement of the cam means.

8. The structure as defined in claim 7 wherein said transmission includes a slidable gear drivingly connected to the drive shaft and including spaced gears thereon for selective driving engagement with the double planet gear for driving the ring gears at different speeds, and means shifting the shiftable gear separate from actuating the brake means.

9. The structure as defined in claim 8 wherein said sliding gear is positionable in disengaged relation to the double planet gear to provide a neutral position for the transmission.

10. The structure as defined in claim 9 wherein said output shaft is hollow and disposed in concentric enclosing relation to a substantial portion of the drive shaft with one end of the drive shaft being connected with the prime mover and with the other end of the drive shaft being drivingly connected to the transmission assembly.

11. The structure as defined in claim 9 wherein said housing is provided with removable supporting plates mounted exteriorly thereof, depending bearing supports carried by said plates for supporting bearings for journalling the drive shaft and output shaft thus enabling accurate positioning of the bearings for the shafts by providing machined surfaces on the exterior of the housing.

12. The structure as defined in claim 11 together with an attachment disposed forwardly of the elongated housing and including a pair of longitudinal frame rails rigidly secured to the housing, front steerable wheels provided on said attachment, a steering wheel for controlling said steerable wheels thereby converting the two wheel tractor to a four wheel tractor.

13. The structure as defined in claim 12 wherein said steering wheel is disposed in inclined position, and an occupant seat supported from the housing and attachment to enable control of the tractor from the occupant's seat.

* * * * *